Patented Sept. 2, 1952

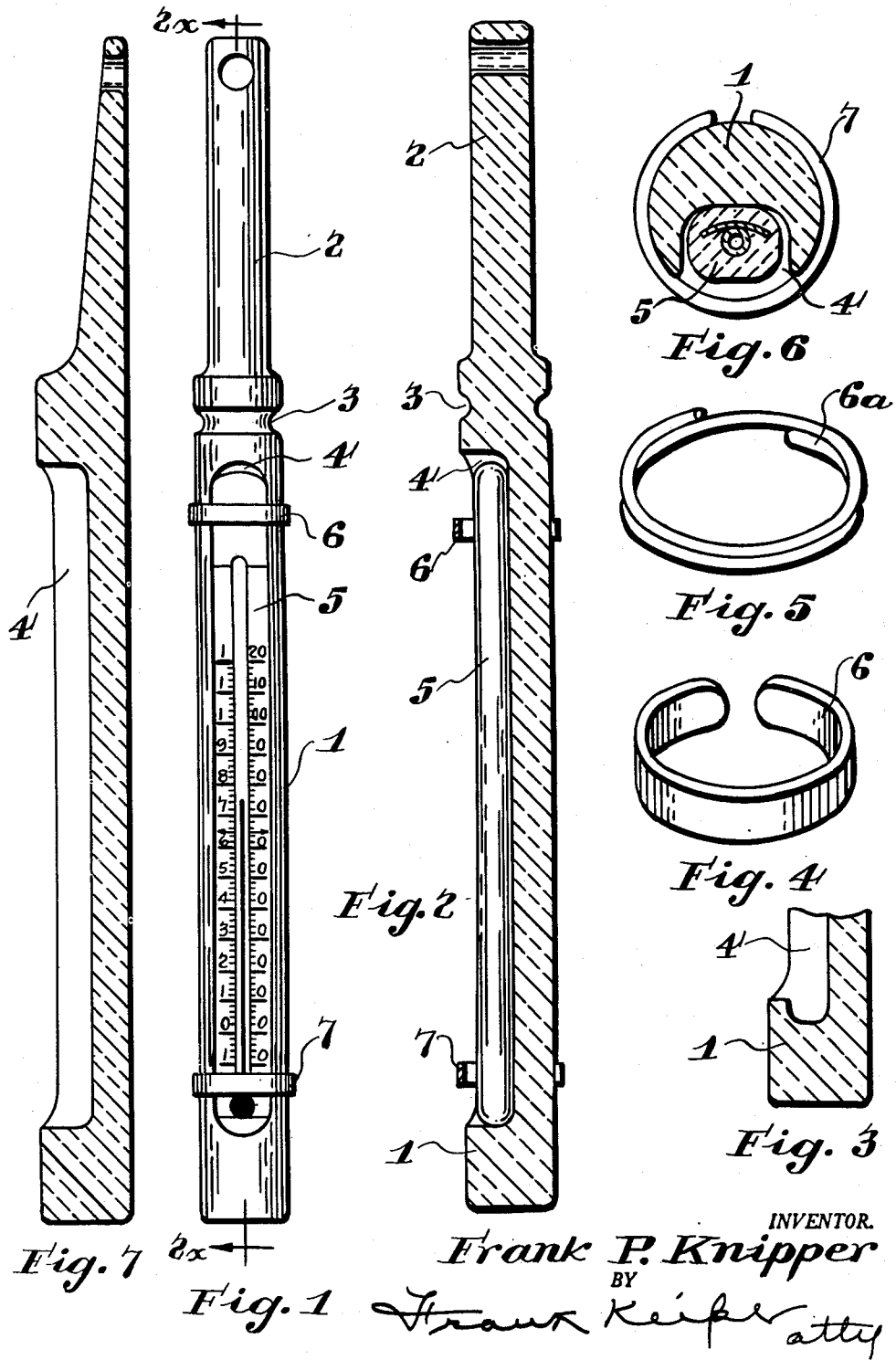

2,608,861

UNITED STATES PATENT OFFICE 2,608,861

COMBINED THERMOMETER AND STIRRING ROD

Frank P. Knipper, Rochester, N. Y.

Application October 7, 1948, Serial No. 53,180

1 Claim. (Cl. 73—343)

The object of this invention is to provide an instrument in which a thermometer tube and a stirring rod the body of which has a flat bottom that can also be used as a pestle or a crushing device in mixing up salts and getting them into solution.

Another object of the invention is to provide a thermometer tube and a casing therefor which casing contains a groove into which the thermometer tube may be positively nested and held, and yet from which it can be easily removed for the purpose of cleaning all the parts of the combination or instrument.

Another object of the invention is to provide a thermometer tube and casing that can be used as a stirring rod in mixing solutions or dissolving salts therein and which will also indicate the temperature of the solution while the stirring is going on.

Another object of the invention is to make the body of the instrument cylindrical in form with a groove therein in which the tube can be nested and in which groove the tube can be held by one or more rings so combined that the rings and thermometer tube can be removed from the so-called casing for the purpose of cleaning the parts thereof separately.

These and other objects of the invention will be illustrated in the drawings, described in the specification and pointed out in the claim at the end thereof.

In the drawings:

Figure 1 is a front elevation of the complete assembly of the instrument.

Figure 2 shows a section on the line 2x, 2x of Figure 1.

Figure 3 shows a modification of the bottom of the casing in which is formed a pocket to receive one end of the thermometer tube.

Figure 4 is a perspective view of one of the sliding rings that is used to hold the thermometer tube in place on the casing.

Figure 5 is a modified form of one of the sliding rings.

Figure 6 is a cross section through the casing and the thermometer tube showing one of the sliding rings in place.

Figure 7 shows a modified form of the handle.

In the drawings like reference numerals indicate like parts.

In the drawings reference numeral 1 indicates the casing of the instrument and 2 indicates a handle therefor. This casing is preferably cylindrical in shape and the handle 2 while also cylindrical in shape is smaller in diameter, as compared with the body of the casing. Just below the handle an annular groove 3 is formed in the casing. Below this annular groove a long concave groove 4 is formed in which the glass thermometer tube 5 is adapted to be nested. This may be a simple tube or a tube within a tube. When the thermometer tube is in place in this groove it is held positively in place therein by sliding the rings 6 and 7 over the ends of the tube. These rings make a rather close sliding fit on the body of the casing and engage over the face of the thermometer tube, and hold the tube in the recess positively. The tube of the thermometer is preferably formed so that it will fill or substantially fill the space between the inside of rings 6 and 7 and the bottom of the groove so that it will not rattle. The parts are assembled by placing the thermometer tube in the groove and then by sliding the upper ring 6 down over the top of the tube and by sliding the lower ring 7 up over the bottom of the tube.

This assembly is used as a stirring rod for putting salts into solution in a liquid and the temperature of the liquid can be taken while the salt is going into solution.

When used in another solution it is necessary to clean the assembly so that no trace of the liquid or salt of one solution will be taken over in another solution. In so doing the rings 6 and 7 can be removed and the thermometer tube 5 can be removed from its groove and all the parts can be carefully and effectively washed and cleaned before using the instrument in another solution. This is important when the device is used in photographic work and for other chemical purposes. After the cleaning of the parts of the instrument is complete, the parts can be assembled and used again in the regular way as above described.

It will be understood that the flat split ring 6a, shown in Figure 4, can be used instead of the wire rings 6 and 7.

Near the top of the body of the instrument an annular ring 3 is cut. The upper shoulder of this annular groove is adapted to engage over or with the rim of the vessel in which the solution is being mixed or made. This will hold the instrument in a suitable position convenient for the operator.

The bottom of the instrument is made flat so that it can be used for the purpose of crushing the salts, that is being dissolved in the liquid in which the instrument is immersed and it can be so used in connection with the stirring and the taking of temperature.

I claim:

The combination of a thermometer tube and a casing therefor in the form of a solid elongated substantially cylindrical rod, blunt at one end and having a handle extension at the other, and adapted to be inserted in a liquid, said casing having a deep groove formed therein lengthwise thereof, said groove being capable of receiving the thermometer tube therein and terminating short of the blunt end and handle extension, elastic retainers slidable on said casing and adapted to retain and overlie the thermometer tube lying within said groove in the casing and engage with the ends of said tube to hold said tube in the groove of the casing, means near the blunt end of said casing adapted to engage with an end of said tube and hold that end of the tube in the casing, there being a deep annular groove in said casing adjacent the handle extension, said groove being adapted to engage the rim of a vessel and retain said handle against sliding below such rim.

FRANK P. KNIPPER.

REFERENCES CITED

The following references are of record in the file of this patent:

UNITED STATES PATENTS

| Number | Name | Date |
|---|---|---|
| 125,453 | Grover | Apr. 8, 1872 |
| 233,906 | Adams | Nov. 2, 1880 |
| 2,276,179 | Ford | Mar. 10, 1942 |

FOREIGN PATENTS

| Number | Country | Date |
|---|---|---|
| 20,049 | Great Britain | Dec. 1, 1894 |
| 21,821 | Austria | Mar. 15, 1905 |